Patented June 8, 1943

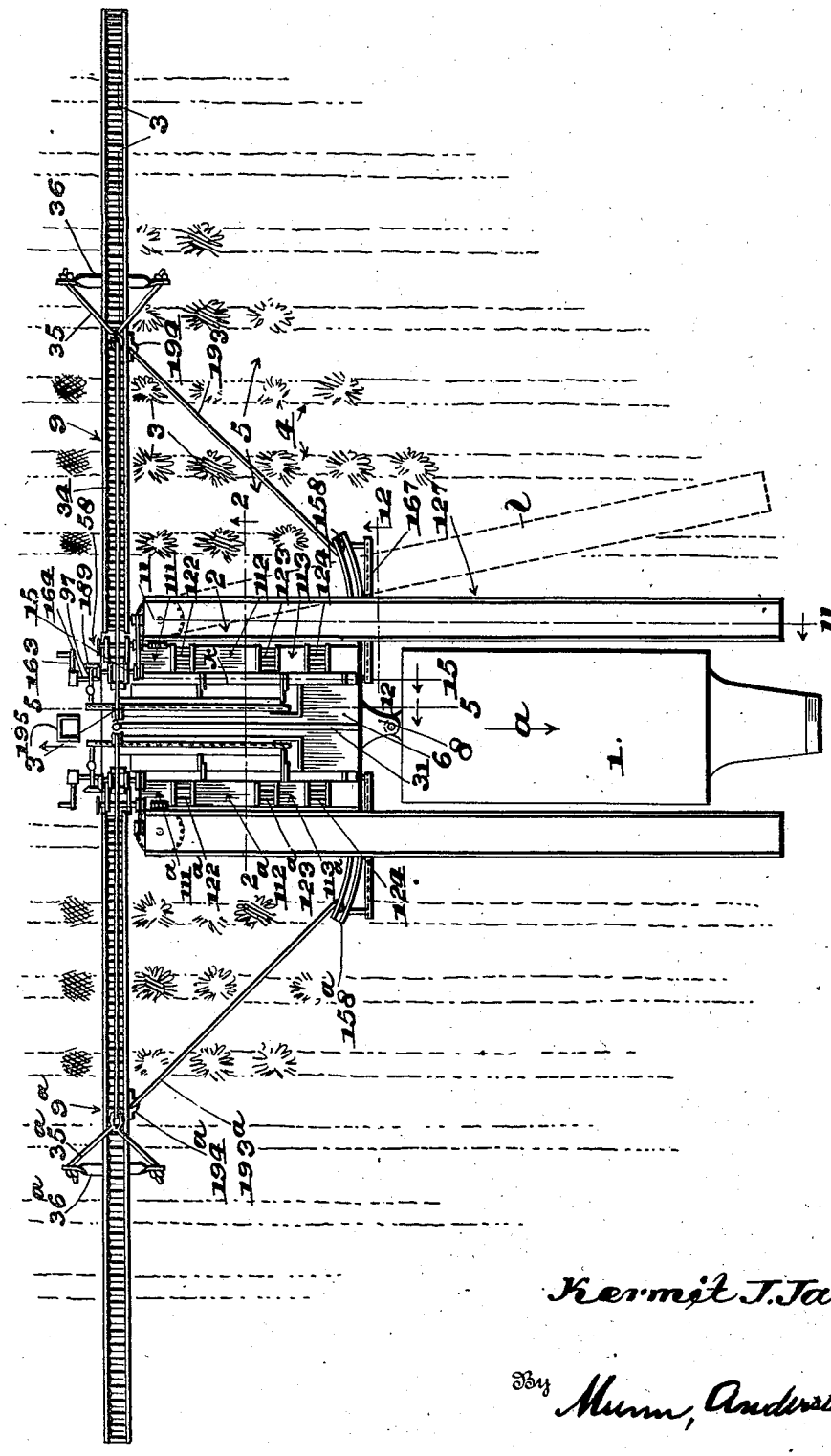

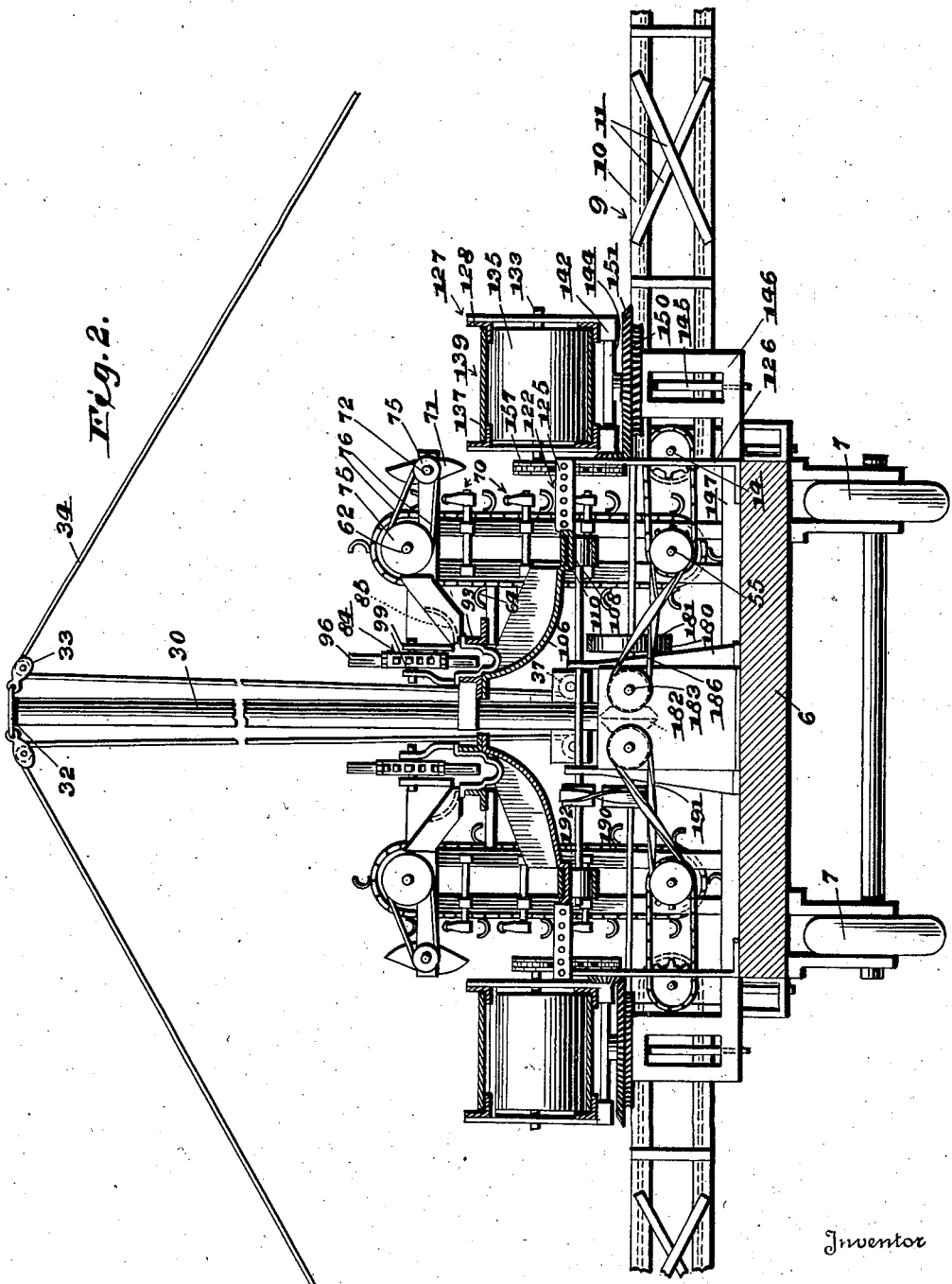

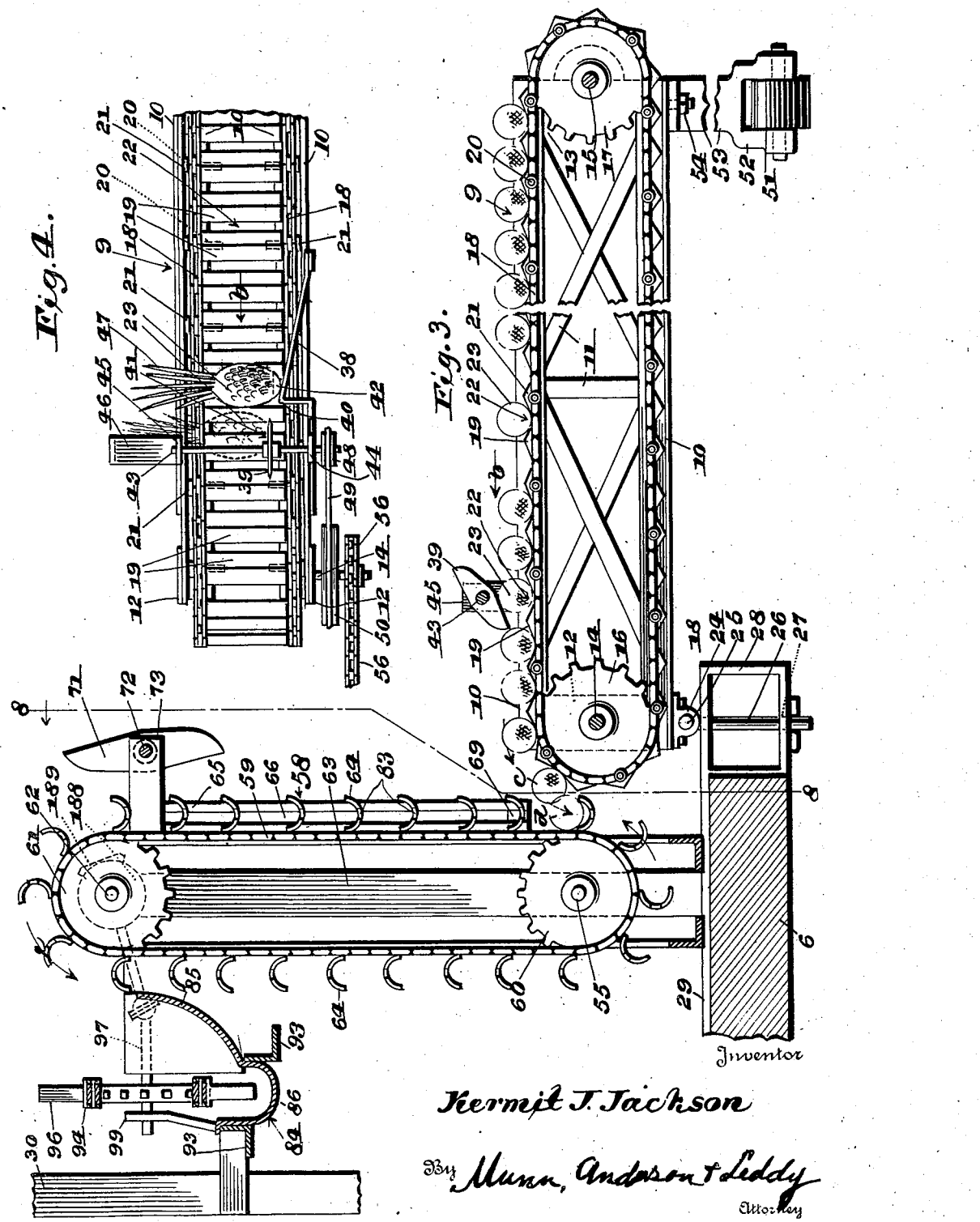

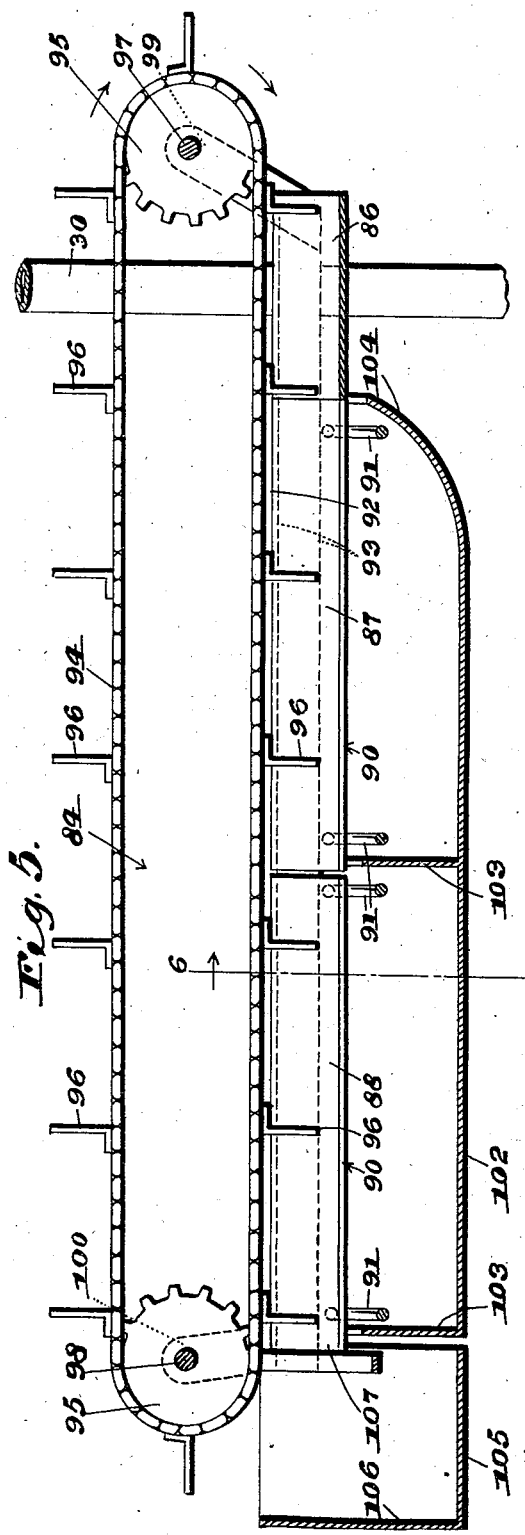

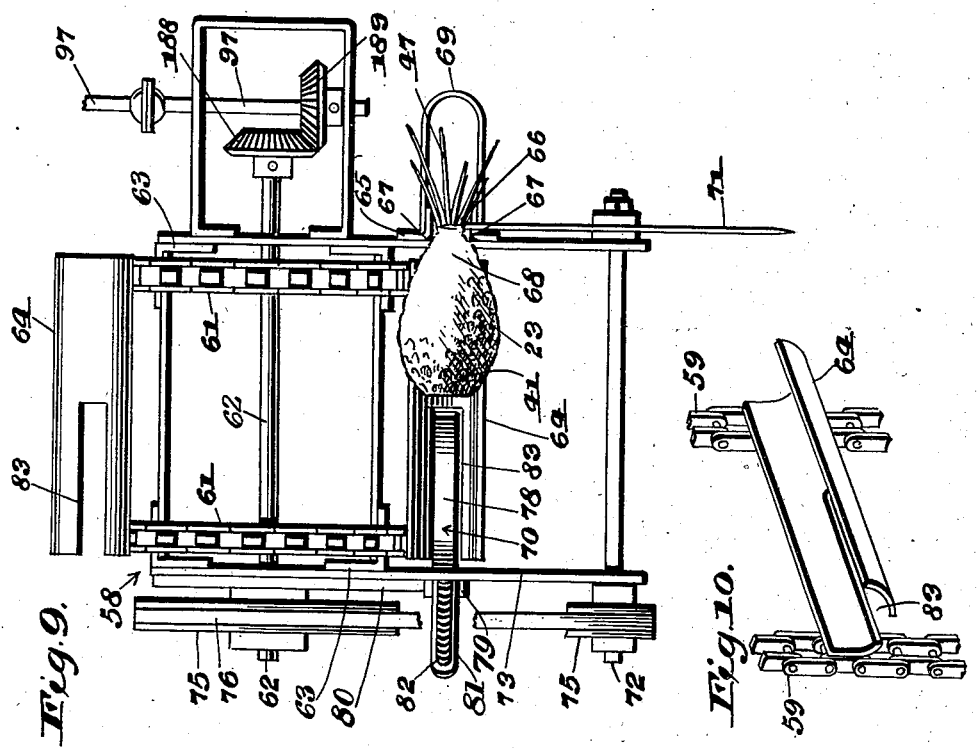
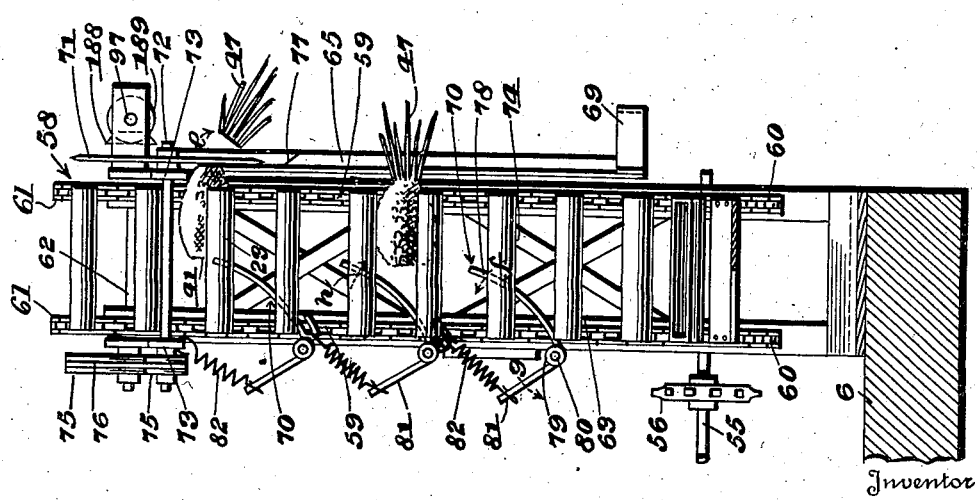

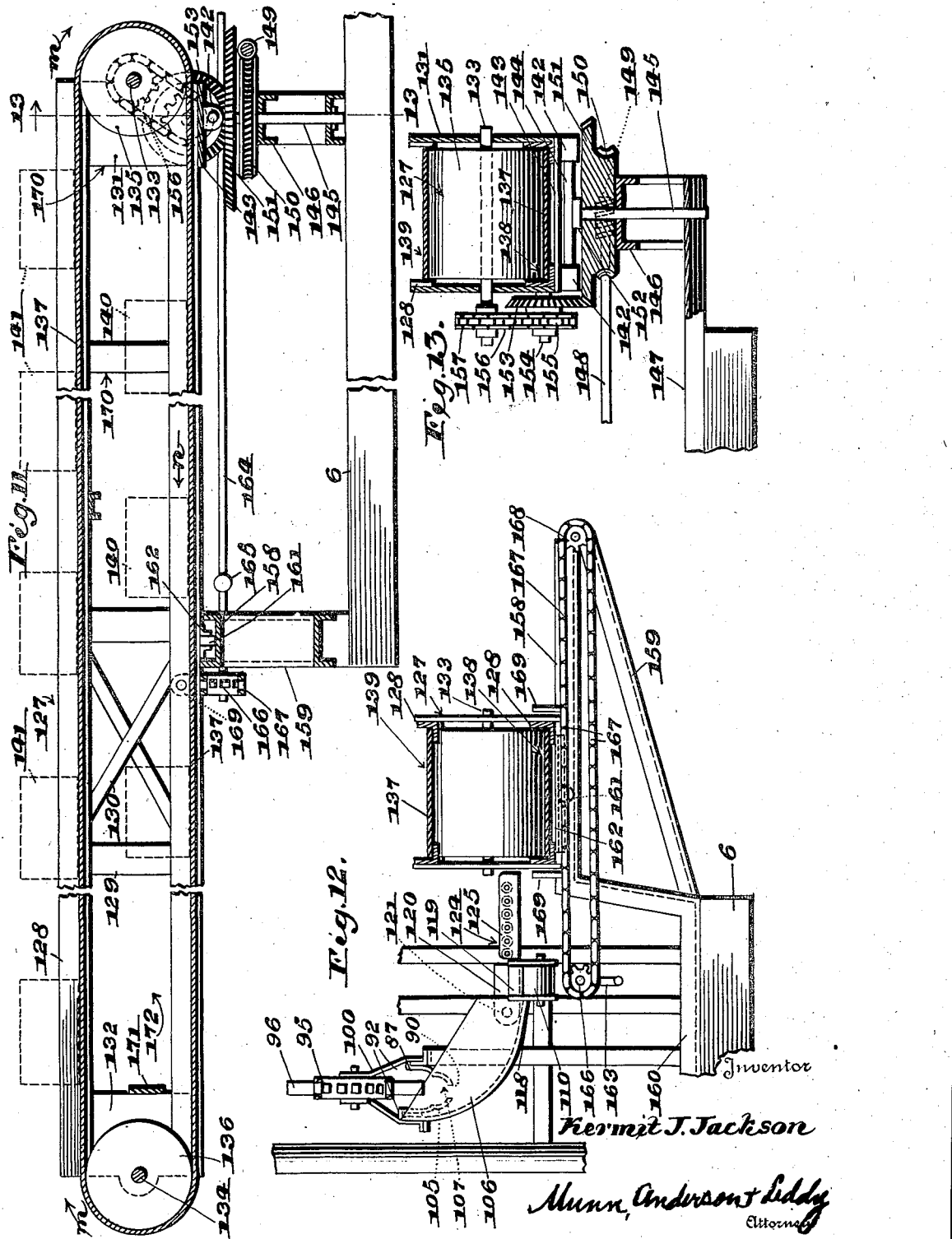

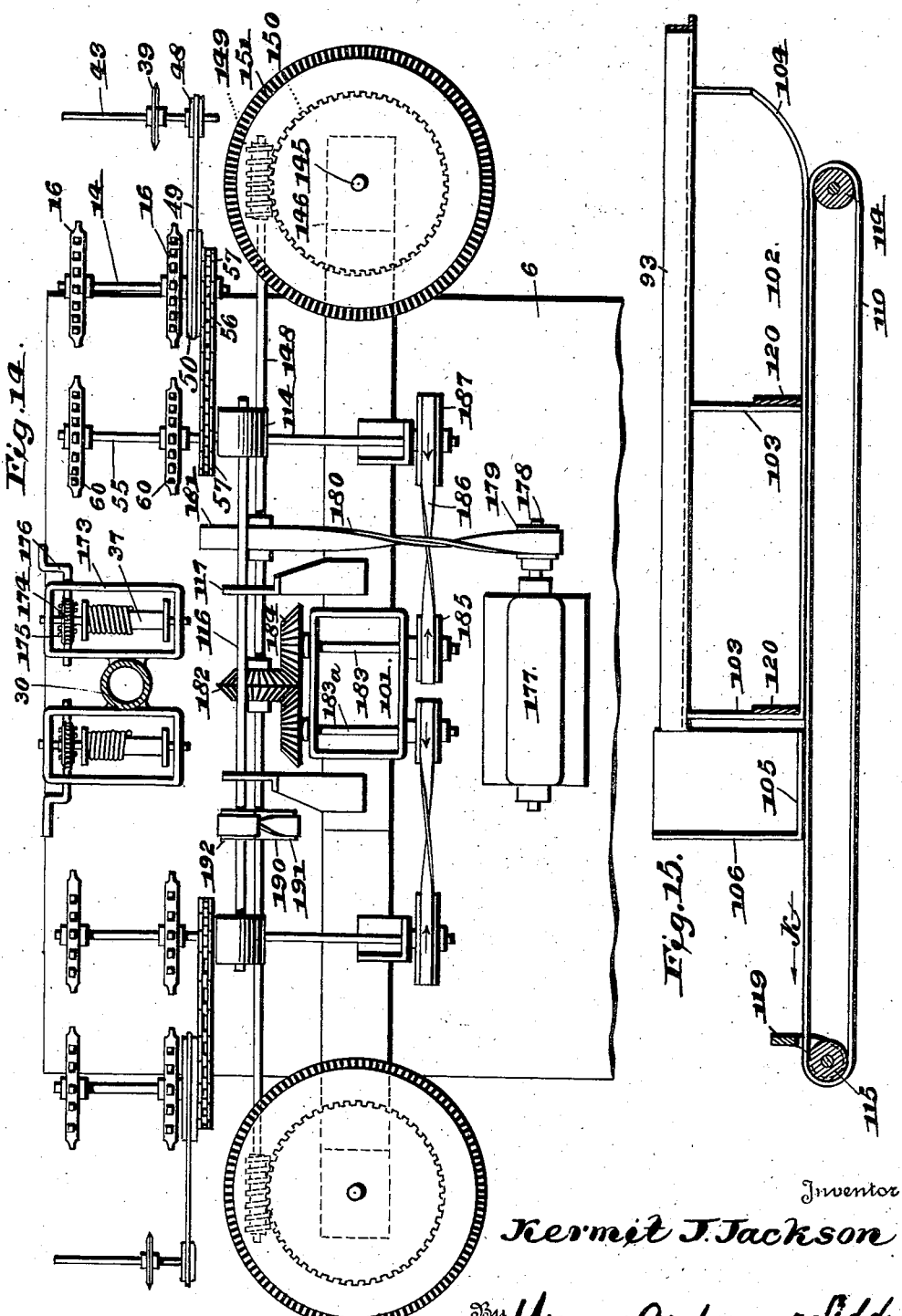

2,321,387

UNITED STATES PATENT OFFICE 2,321,387

PINEAPPLE HARVESTER

Kermit J. Jackson, Honolulu, Territory of Hawaii

Application January 3, 1940, Serial No. 312,276

5 Claims. (Cl. 214—83)

This invention relates to improvements in harvesting machinery, although its underlying function is that of an accessory to the manual work of harvesting, it being the men who pick the pineapple from the plant and introduce it into the machine, whereupon the latter acts to trim and grade the fruit and to supply the boxes into which said fruit is then packed by workmen transported upon the machine. The customary mode of harvesting pineapples is to pick them, fill bags therewith and carry the loaded bags to the ends of the lines or rows of pineapples on the backs of the workmen.

The fruit is there dumped upon the ground, which is often in a muddy condition, necessitating the extra cost of the services of other workmen to sort over the fruit in the process of trimming, grading and packing. Another item of current practice is to unload a more or less large number of boxes in proximity to the dumping ground, it being a frequent occurrence that the number of boxes unloaded is in excess of the requirements, this resulting too often in hundreds of boxes being left unused for days and subject to the danger of being run over and broken by trucks.

On the same principle it is as likely that too few boxes will be left where required, thus necessitating leaving the picked pines lying upon the ground and subject to being crushed and thrown around. The foregoing are the main disorders which the use of the instant apparatus seeks to overcome.

One of the fundamental purposes of the latter is to speed up the process of picking the pineapples. A large percentage of spoilage is readily avoided inasmuch as the fruit can be transported to the cannery during the same day that it is picked. This enables the canning of any bruised fruit which, under other circumstances, would begin to ferment. The use of the apparatus also eliminates the need of the shipping truck entering the field twice, once to unload the empty boxes mentioned above, the second time to pick up the load. With this preamble in mind the objects of the invention are as follow:

First, to provide an apparatus intended for use primarily in the harvesting of pineapples, to which end the harvester has facilities for handling the pineapples from their growing state to their final packing in boxes for shipment, this handling comprising the functions of both human labor and machinery.

Second, to provide an apparatus as described wherein the gathering conveyors or booms extend in both lateral directions from the sides of the machine over several pineapple lines or rows so as to enable covering a fairly large territory at each traverse of the machine, there being a provision for raising and lowering the outer ends of boom conveyors to conform to uneven fields.

Third, to provide for turning said boom conveyors from their laterally extended positions into positions of substantial alinement with the sides of the machine so as to facilitate transportation of the apparatus from field to field, use then being made of demountable wheels at the far ends of said conveyors to ride the ground and carry the weight and thus relieve the suspension cables.

Fourth, to utilize a suitable automobile truck for the locomotion of the apparatus as a trailer across the pineapple field, said apparatus carrying an independent engine for driving the mechanism embodied therein.

Fifth, to employ what is herein known as a packing conveyor in conjunction with the foregoing truck, said conveyor being normally positioned alongside of the truck so as to be readily accessible to both the truck and to certain grading and distributing apparatus on the base of the harvester, said packing conveyor being swingable on a pivot so as to assume a flaring position in reference to the side of the truck.

Other objects and advantages will appear in the following specification, reference being had to the accompanying drawings, in which:

Figure 1 is a plan view of the pineapple harvester, illustrating its relationship to a field with lines or rows of growing pineapples.

Figure 2 is a cross section of the apparatus taken on the line 2—2 of Fig. 1.

Figure 3 is a longitudinal section of one of the gathering conveyors, taken on the line 3—3 of Fig. 1.

Figure 4 is a detail plan view of a portion of the gathering conveyor illustrating the primary trimming knife.

Figure 5 is a longitudinal section of the grading trough taken on the line 5—5 of Fig. 1.

Figure 6 is a cross section taken on the line 6—6 of Fig. 5.

Figure 7 is a perspective view of one of the detachable graders.

Figure 8 is an elevation of one of the fruit elevators as seen on the plane 8—8 of Fig. 3.

Figure 9 is a plan view of the structure shown in Fig. 8.

Figure 10 is a perspective view of one of the elevator troughs in Fig. 8.

Figure 11 is a longitudinal section of one of the packing conveyors taken on the line 11—11 of Fig. 1.

Figure 12 is a cross section of the packing conveyor taken on the line 12—12 of Fig. 1, also illustrating a portion of the grading trough.

Figure 13 is a vertical section taken on the line 13—13 of Fig. 11 illustrating the pivotal mounting of one of the packing conveyors.

Figure 14 is a plan view particularly illustrating the drive gearing of the machine.

Figure 15 is a longitudinal section taken substantially on the line 15—15 of Fig. 1.

It is desired to state by way of preface to the following description that the trimming apparatus and the grader for the pineapples, although disclosed in full, are specifically claimed in divisional applications filed by Kermit J. Jackson, filed November 5, 1940, Serial No. 364,451 and Serial No. 364,452 respectively.

In carrying out the invention use is made of an automobile truck 1 of any known type (Fig. 1) as the means by which the harvester apparatus 2 is drawn over the ground. The latter comprises a field of pineapples 3 which are shown planted in rows 4, or lines, as they are commonly called. These lines or rows are separated by narrow paths 5 which are intended to be walked upon by the workers as they pick the ripe fruit from the plants.

The apparatus 2 is mounted upon a base 6 (Fig. 2) which is suitably wheeled at 7 so as to run on the ground surface. This wheeled base carries all of the harvester apparatus. The latter follows the truck 1 as a trailer because of the coupling 8 between the truck 1 and the base 6. The truck 1 is intended to move slowly, and as it does the workmen pick and deposit the pineapples upon each of a pair of gathering conveyors 9. At this point it may be stated that the left and right sides of the harvesting apparatus are duplications. For that reason the description is facilitated by confining it to that half of the mechanism on the right of the longitudinal center of the apparatus. It is to be understood that this description applies to the left half in every respect, and at such places whereat it is deemed expedient to duplicate the reference numerals on the left side, said numerals are distinguished by having the exponent letters $a$ added thereto.

It has been stated that the gathering conveyor 9 serves as a place of deposit of the pineapples as they are picked from the plant by the workmen following the apparatus. The latter is supposed to be traveling in the direction of arrow $a$ (Fig. 1). The conveyor 9 extends laterally of the apparatus 2 like a long boom and because of that relationship it traverses the rows 4 so as to be in the most convenient position possible. The conveyor 9 comprises a framework which consists fundamentally of four angle irons 10. These angle irons are arranged in upper and lower pairs in which relationship they are held by a system of bracing 11 (Fig. 3). This bracing includes headers 12, 13 (Fig. 3) which provide the supports for cross shafts 14, 15. Said shafts carry pairs of sprocket wheels 16, 17, to which chains 18 are applied.

The distance between these chains is spanned by cross sectionally triangular cross pieces 19 of hard wood (Figs. 3 and 4). These cross pieces are appropriately affixed to parts of the chains 18, pins 20 being used periodically to function as the securing means as well as the trunnions of rollers 21. These rollers run upon the uppermost pair of angle irons 10 and thus relieve the conveyor 9 of much of the drag which would otherwise occur.

The purpose in making the cross pieces 9 of triangular form is to define a series of pockets 22 (Fig. 3) into which the pineapples 23 are deposited by the workmen as they follow the mechanism. To the foregoing end of utilizing the cross pieces 19 as pockets, it is noted that said cross pieces are spaced longitudinally. This spacing is of a predetermined distance and match as the spacing of certain troughs of a fruit elevator presently described.

It is observed in Fig. 3 that the lower flight of the conveyor 9 is not permitted to sag. This would be objectionable because of the length of the gathering conveyor. The arrangement is such that the cross pieces 19 are permitted to drag along the lower pair of angle irons 10. The rollers 21 do not ride these angle irons as in the case of the top flight, but it is readily conceivable that they could be made to do so.

A pair of bearings 24 of which one is shown in Fig. 3, provide the support for the horizontal arm 25 of a T, the vertical stem 26 of which is turnably set in holes 27 of an extension 28 from the base 6. This extension is part of a metal plate 29 which goes across on top of the back of the base. The mounting of the horizontal arm 25 in the bearings 24 provides for a limited vertical turning of the gathering conveyor 9, while the mounting of the vertical stem 26 in the extension 28 provides for the requisite motion in the horizontal direction.

The resulting swivel connection affords sufficient freedom of the gathering conveyor 9 to adapt itself to variations in the ground level. This leads to the mode of suspension of the gathering conveyor. A mast 30 (Fig. 2) is erected rigidly upon the base 6 and is appropriately braced in respect thereto for example by means of the strut 31 (Fig. 1) which is shown extending forwardly to a place of anchorage upon the base 6. The top of the mast is capped at 32 to provide a place of attachment of a pulley block 33. A cable 34 is trained over the pulley in this block, and one end of it extends out to a point of attachment at the bight of a sling 35 (Fig. 1) which loosely bridges the length of a cross arm 36, to the ends of which said sling is attached in any suitable way. The other end of the cable 34 is wound on a drum 37 (Figs. 2 and 14) to which reference is made again farther down.

As the pineapples 23 are advanced inwardly of the apparatus (arrows $b$, Figs. 3 and 4) they first encounter a guide 38 (Fig. 4). The workmen are supposed to exercise care in emplacing the pineapples upon the conveyor 9 so that the stem ends will face forwardly. Said ends then ride across the guide 38, and inasmuch as the latter is pitched inwardly of the conveyor it follows that the pineapples will be properly aligned with the primary trimming knife 39, which is located contiguously to the shoulder 40 of the guide. The function of the knife 39 is to produce a clean cut across the butt or root end as at 41. The root end 42 thus drops off. This function is achieved by setting the knife 39 in from the shoulder 40, the lateral distance between the highest point of the shoulder and the plane of the knife 39 representing the amount that is cut off from the base of the pineapple.

A shaft 43 carries the knife 39. Said shaft is journaled in bearings 44, 45, which extend up from the conveyor framework. The bearing 45 has a large lateral loop 46 which makes room for the foliage 47 of the pineapple. The shaft 43 carries a pulley 48 which is belted at 49 to a driver pulley 50. The latter is carried by the cross shaft 14 of the conveyor and inasmuch as the driver is much larger than the pulley 48 it follows that the latter will revolve at a much higher rate of speed. In practice this will be made adequate to secure clean cuts as the pineapples pass by.

Inasmuch as the gathering conveyor 9 must be left extended during transportation of the apparatus from one field to another, use is made of a demountable wheel 51 at the approximate extremity of the conveyor 9 (Fig. 3). This wheel is journaled in the fork 52 of an arm 53 which depends from the underside of the conveyor framing. At that point said arm is secured by means of a nut and bolt 54. This connection is desirably made to afford the demountable feature of the wheel 51, so that the latter can be removed from the apparatus if and when desired. However, under ordinary circumstances said wheel is an asset inasmuch as it relieves a great deal of strain from the cable 34 when the wheel is permitted to ride the ground.

Power for the operation of the gathering conveyor 9 is derived from a countershaft 55 (Fig. 14) which has a chain and sprocket wheel connection 56, 57, with the cross shaft 14. This connection synchronizes the motion of the gathering conveyor 9 with a fruit elevator 58 (Fig. 3). Said elevator comprises a pair of chains 59 which are trained over pairs of sprockets 60, 61, respectively on the counter-shaft 55, and a cross shaft 62 in a matching position at the top of a standard 63. The chains 59 carry troughs 64 at intervals. The spacing of these troughs matches the spacing of the pockets 22 between the cross pieces 19. This circumstance makes evident the need for synchronization between the gathering conveyor 9 and the fruit elevator 58.

As the pineapples 23 (Fig. 3) advance along the conveyor 9 they ultimately reach the full line position c, whence they roll off into the dotted line position d. One of the troughs 64 will then be in the act of rising, and since the two elements are synchronized as stated, the pineapple will roll gently into the trough without any danger of being bruised or crushed. The troughs 64 are ended, so to speak, by a guide 65, which is slotted at 66 (Fig. 3). The purpose of the guide is to provide an abutment for the foliage end of each pineapple.

This function is illustrated in Figs. 8 and 9. The angle irons which comprise the guide 65 are rounded rather fully at 67 to provide rests for the contiguous end 68 of the pineapple. The foliage 47 is intended to project through the slot 66 which the spacing of the angle irons affords. The two angle irons are firmly connected so as to maintain said spacing, but at least one of the connections 69 is of loop form so as to allow for the passage of the foliage.

The pineapples 23 are pushed over toward and into the guide 65 by a series of packers 70 (Fig. 8). Each of these comprises a pusher which is adapted to allow for a variety of lengths and to exercise pressure on the previously trimmed base end so as to properly emplace each pineapple in respect to a rapidly rotating secondary trimming knife 71. This knife is carried by a shaft 72 which is journaled in brackets 73. These brackets are a part of the standard 63 and in practice the latter may consist of a framework somewhat on the order of the framework of the conveyor 9, the elements thereof being braced at 74 (Fig. 8) to produce a perfectly stable structure.

The driving of the knife 71 is accomplished by pulley and belt connections 75, 76 (Fig. 8). The pulleys are carried by the conveyor and knife shafts 62, 72. The former pulley is largest, thereby providing for the speed necessary for the proper operation of the knife 71. The latter operates directly in back of the guide 65 (Fig 9) so that the foliage 47 is removed with a clean cut (arrow e, Fig. 8) as each pineapple is brought into position. As seen in Fig. 8 the flange of the outermost angle iron is cut away at 77 so as not to interfere with the motion of the knife.

Each of the packers 70 comprises a blade 78 pivoted at 79 to a fixedly mounted stud 80 that projects out from the standard 63. The pivotal mount 79 may comprise a sleeve that is turnably carried by the stud. An arm 81 extends off from this sleeve and it provides the anchorage for one end of a spring 82, the other end of which is anchored elsewhere, preferably to the blade 78 next highest.

Thus, as each blade 78 is depressed (arrow f, Fig. 8) the resulting motion of the respective arm 81 (arrow g) expands the attached spring 82, but in doing so swings the packer next highest inwardly to a slight degree (arrow h). Thus while one of the packers is occupied with pushing a pineapple over to the right to the foliage trimming position, the packer next highest is moved inwardly to insure its standing in the farthest in waiting position and in readiness for the pineapple when the later is elevated into the range thereof.

With respect to the highest packer 70, it is necessary to anchor the respective spring 82 somewhere on the standard 63, for example, to the nearest bracket 73. Each of the troughs 64 is slotted at 83 (Fig. 10) to pass the series of packers 70. These slots are central of the troughs, and since they obviously are intended to match the positions of the packers, it follows that the latter will exercise their pressure more or less directly against the center of the butt of the pineapple. This, in turn, insures the best possible positioning of the pineapple for the trimming off of the foliage.

Following the cutting off of the foliage 47, which completes the trimming operation, the pineapple passes over the crown of the elevator 58 (arrow i, Fig. 3) and falls into a grader 84 (Figs. 3 and 5) by way of a curved chute 85. This chute is integral with a fixed trough section 86 (Fig. 3). This section heads a plurality of detachable troughs 87, 88. These troughs are also known as detachable graders. Two of them are shown, but the number can be varied to meet the needs of any particular apparatus.

Fig. 7 illustrates one of these troughs or graders. The trough 87 is chosen for example. It consists of a pair of sides 89 which are spaced to define a slot 90 from end to end of the trough. The spacing is established by yokes 91. The ends of these yokes are secured to the sides 89 in any desired way, and said yokes extend down far enough not to interfere with the progress of the pineapple.

The spacing of the slot 90 will be the narrowest of the two troughs 87, 88. Consequently the small pineapples will fall through first. The slot 90 of the trough 88 is for the larger pineapples. The sides 89 (Fig. 7) are flanged at 92. The flanges of the troughs are rested upon the top edges of rigidly mounted angle irons 93 (Fig. 3) which comprise parts of the grader 84. It is between these angle irons that the trough 86 is fixed at the head of the grader. Inasmuch as the troughs 87, 88 are separate from each other and are merely rested upon the angle irons 93, it follows that said troughs can be detached from the grader and substituted by others having a different slot spacing.

A drive chain 94 (Fig. 5) operates above the grader 84. The sprockets 95 which carry it are mounted at such an altitude that the lower flight of the chain 94 traverses the top plane of the grader 84, or substantially so. This chain carries paddles 96 which, when traversing the grader 84 because of said relationship of the lower chain flight, push the pineapples from the fixed trough 86 along the other troughs 87, 88 until they fall through one or the other of the slots 90.

The sprockets 95 are carried by shafts 97, 98. Said shafts are journaled in brackets 99, 100, which extend up from parts of the framing. Driving power for the chain 94 (Fig. 5) is derived from a transmission 101 (Fig. 14). The transmission and other driving details are described farther down. As the graded pineapples fall through the slots 90 (Fig. 8) they enter a curved chute 102 which is partitioned at 103 to so sub-divide the chute that there will be a section for each one of the detachable graders. The head end of the chute 102 has a rounded terminal 104 which prevents any inadvertent backing off of the pineapples. The rounding causes the pineapples to roll forwardly. The other extremity 105 of the chute 102 is ended at 106 to retain the last and largest pineapples.

At this point it is observed in Fig. 5 that the chute extremity 105 extends beyond the adjacent terminal 107 of the grader trough. Said terminal is open. Pineapples sufficiently large to avoid falling through the slot 90 of the last trough 88 are discharged at the open terminal 107 into the extremity 105.

The chute 102 curves down and eventually merges into a belt trough 108 (Fig. 6). This trough is flanged at 109 to insure the retention and guidance of the top flight of a conveyor belt 110. This belt is intended to receive pineapples as they roll down the chute 102 and then convey them forwardly (arrow k, Fig. 1) past a number of workmen's stations 111, 112, and 113. This belt is carried by a pair of pulleys 114, 115 (Fig. 15), the first of which is one of a pair on a shaft 116 (Fig. 14) that extends crosswise of the machine.

Said shaft 116 and the shaft of the pulley 115 are supported by brackets 117, 118. The brackets 118 are parts of the belt trough 108 and their formation includes a fence 119 (Fig. 15) which is intended to prevent the inadvertent passage of a pineapple beyond the forward extremity of the conveyor belt 110. The partitions 103 (Fig. 5) have extensions 120 across the belt trough 108 serving the purpose of stops for the pineapples of the various grades. Each extension or stop is pivoted at 121 to the respective partition. The normal position of each stop is down, thereby to confine the various pineapples to those portions of the chute 102 devoted to the prearranged sizes. If it should be chosen to let some of the pineapples pass down to the next grade, the stop 120 may be raised to the dotted line position (Fig. 6), thus to remove the obstruction from across the belt 110.

Each of the workmen's stations 111, 112, 113, is distinguished by having a roller table at one side. These roller tables are designated 122, 123, and 124 (Fig. 1). The roller table 122, using this one as an example, comprises a pair of sides 125 (Fig. 2) supported at their ends by the belt trough 108 and by braces 126 which extend down to the base 6. The roller tables divide the various workmen's stations, and as empty boxes previously emplaced on these tables are filled they are rolled off onto a packing conveyor, the rollers facilitating the necessary manual effort in making the change-over.

The packing conveyor is designated 127 (Figs. 1 and 11). It is in the nature of a long boom in which respect it resembles the gathering conveyor 9. It comprises a rigid frame 128, preferably made up of an assemblage of angle irons (Fig. 12) which are connected by plates 129 (Fig. 11) and crossed braces 130. The bracing of the frame 128 includes sets of end plates 131, 132, which are modified to provide bearings for the shafts 133, 134, of the pulleys 135, 136 by which the belt 137 is carried and driven. Both flights of the belt are located on top of the horizontal flanges of the angle irons 128 (Fig. 12), said angle irons being so stationed that all of them have their remaining flange components extended upwardly, thus to provide lateral guides to keep the boxes in place.

In effect the packing conveyor 127 provides a double trough. These troughs are readily distinguished in Fig. 12 where they are designated 138, 139. The socalled trough 138 accommodates full boxes 140 (Fig. 11) while the trough 139 accommodates the empties 141. Since these boxes are usually as broad as the conveyor 127 is wide, or substantially so, the weight of the load is imposed in each instance upon the horizontal flanges of the angle irons 128. This is a material factor in the prevention of the sagging of each flight of the belt.

As in the instance of the gathering conveyor 9 (Fig. 3) the packing conveyor 127 is pivoted at one end. The pivot structure comprises bearings 142 (Figs. 11 and 13) on the underside of a portion 143 of the end plates 131. These bearings are turnably supported on the horizontal arm 144 of a T, the vertical stem 145 of which is journaled for horizontal turning of the conveyor 127 in a step 146 at the virtual extremity of a crosspiece 147 on the base 6.

Driving power for the conveyor belt 137 is derived from a worm shaft 148 (Fig. 14), the worm pinion 149 of which is in mesh with a worm gear 150 (Figs. 11, 13 and 14). This worm gear is integral with a large bevel gear 151, the assembled gears being situated between the step 146 (Fig. 13) and a boss 152 on the stem 145. From this arrangement it is seen that the assembled gears have bearing on the step. They rotate upon the stem 145, but are totally independent thereof. The weight of the adjacent end of the conveyor 127 is rested upon the assembled gears by virtue of the bearing that the boss 152 has upon the gear 151.

It is thus possible for the conveyor 127 to be turned horizontally without affecting the gears 150, 151, and on the same principle for said gears to rotate continuously at any radial position of the conveyor. The earlier function is achieved by the intermeshing of a bevel pinion 153 (Fig. 13) with the gear 151. The shaft 154 by which this pinion is carried juts out from the conveyor frame 128 (Fig. 13). Said shaft is rigid on the frame and in addition to carrying the bevel pinion 153 it also carries a sprocket 155. Said sprocket and the bevel pinion are preferably made as one.

The chain 156 of the sprocket 155 is applied to a sprocket wheel 157 on one end of the shaft 133. Thus the driving power derived from the worm shaft 148 is transmitted to the packing conveyor belt 137 through the gearing and sprocket connections shown in Fig. 13.

Inasmuch as the packing conveyor 127 is required to handle a fairly heavy load at all times, provision is made of a rest 158 approximately midway of the length of said conveyor (Figs. 1 and 11). This rest is desirably made of channeled iron (Fig. 11). It is constructed in a substantially triangular form (Fig. 12) so that the hypotenuse 159 can function as a brace. Said rest is part of a channel piece 160 (Fig. 12) which goes across the base 6 and has the rest 158 duplicated on the other side.

The flanges of the top portion of the rest 158 are directed upwards, thus to provide a passageway and guide for a roller 161 on the underside of the packing conveyor 127. This roller is carried by a support 162 (Fig. 12) which is attached to and spans the distance between the lowermost pair of the angle irons 128. The rest 158 is curved (Fig. 1) to match the arc on which the conveyor 127 is adapted to swing when moved on its pivot stem 145.

The purpose of moving the packing conveyor 127 on its pivot is to flare it in respect to the truck 1. It is readily seen in Fig. 1 that when said conveyor is moved to the approximate dotted line position l, the truck 1 is readily backed into position for the securing of the coupling. This movability of the packing conveyor 127 is also to advantage in the use of the apparatus because there are times when the workmen will need more room, and at other times the shifting of said conveyor facilitates loading and unloading.

Said shifting is done by a crank 163 (Fig. 1) on the rear end of a shaft 164 which may or may not require universal joints, such as depicted at 165 (Fig. 11). This shaft is journaled upon the framing and at its forward end it carries a sprocket 166 (Fig. 12) to which a chain 167 is applied. This chain is supported by an idler sprocket 168 on the outer extremity of the rest 158. A pair of clips 169 (Fig. 12) upstanding from the top flight of the chain 167 have the packing conveyor 127 stationed between them, for which purpose they are spaced the requisite distance. Upon turning the crank 163 either one way or the other, the packing conveyor is turned on its pivot 145 (Fig. 13) into either of the two positions shown in Fig. 1, or into a position intermediately thereof.

The direction of motion of the top and bottom flights of the belt 137 (Fig. 11) is shown by the arrows m, n. The empty boxes 141 being lightest are more readily lifted down from the altitude of the top flight than if they had to be handled at this distance in their loaded condition. The bottom flight of the belt is slightly below the level of the roller tables 122, 124 (Fig. 12) and for that reason it is easiest to move the loaded boxes from said tables through appropriate side openings 170 in the conveyor frame 128 onto the bottom flight of the belt. The loaded boxes are carried forwardly and are adapted to be checked by a stop 171 that is part of the end plates 132 (Fig. 11). An opening 172 adjacent to this stop provides for the removal of the loaded boxes.

Reference is next made to Fig. 14 which shows other details of the driving mechanism. Going back to the suspension of the gathering conveyor 9, the drum 37 upon which the inner end of the cable 34 is wound, is shown as being mounted in a frame 173 which is desirably attached to the mast 30. The drum shaft carries a worm gear 174 which is adapted to be turned by a worm pinion 175 on a hand crank shaft 176. The nature of the intermeshing worm teeth provides a check against the counter-rotation of the drum 37 when an adjustment of the free end of the conveyor 9 is arrived at. However, should the need of a pawl and ratchet develop, these elements are readily added to supply an extra check against the counter-rotation of the drum.

The transmission 101 derives its power from an engine 177 of any desired kind. This engine is carried by the base 6, and it is independent of the engine in the truck 1. The shaft 178 of the engine 177 carries a pulley 179 or its equivalent, which is belted at 180 to a larger pulley 181 on the worm shaft 148. This shaft carries a double-bevel pinion 182, the obvious purpose of making it double being to simultaneously drive the pair of shafts 183, 183a of transmission 101.

The shaft 183 has a bevel gear 184 in mesh with the pinion 182, and it carries a pulley 185 which is belted at 186 to a pulley 187 on the counter-shaft 55. This shaft, it will be remembered (Fig. 3), drives the fruit elevator 58. The top cross shaft 62 of said conveyor has a bevel gear 188 (Figs. 3 and 9) in mesh with a bevel pinion 189 on the previously mentioned shaft 97 (Fig. 5) of the grader 84. Thus the belt 186 (Fig. 14) drives the fruit elevator 58 and the grader 84 and inasmuch as the chain 56 (Fig. 14) is coupled to this source of power, said belt 186 also serves to drive the gathering conveyor 9.

The pulley 116 of the conveyor belt 110 (Fig. 15) is driven by a belt 190 (Fig. 14) which is applied to drive and driven pulleys 191, 192, respectively, on the worm shaft 148 and the pulley shaft 115. In concluding the description note is made of the seat 195 (Fig. 1) which is desirably but not necessarily mounted on the base of the apparatus behind the mast 30. This seat is for an operator who will be required for the working of the various controls and also for the supervision of the workmen and the apparatus.

The operation is readily understood. The general assemblage is illustrated in Fig. 1. The gathering conveyors 9, 9a, extend out to each side of the base 6 so as to sweep over the rows 4 of plants. Obviously this statement is thus limited because of the specifically stated use of the apparatus. But by an extension of the principle the apparatus could be used in conjunction with gathering objects other than pineapples. The workmen in the field follow the assemblage which is supposed to be traveling in the direction of the arrow a (Fig. 1).

As they pick the pineapples from the plant they place them in the pockets 22 (Fig. 3), whereupon they are transported first past the primary trimming knife 39 whence they are delivered to the fruit elevator 58 for another trimming by the secondary knife 71. The butt and foliage ends are thus carefully trimmed.

The trimmed pineapples are then delivered to the grader 84 by way of the chute 85 (Fig. 3) along which grader the pineapples are shoved by the paddles 96 (Fig. 5) depending from the lower flight of the drive chain 94. The various sizes of pineapples drop through the slots 90 of the two grading troughs 87, 88, the largest pineapples being discharged at the terminal 107. All of them fall into the chute 102, 105, which is partitioned to keep the various sizes separate. The conveyor belt 110 moves all of the pineapples forwardly so as to place them within reach of the workmen in the stations 111, 112, 113.

It will be understood that in actual practice these stations will be a little farther apart than indicated in Fig. 1. For example, there would be more space rearwardly of the roller table 122 than indicated. Inasmuch as the workman in the station 111 stands directly beside said roller table it follows that the belt 110 has utility in respect to that station, inasmuch as in actual practice the trough 87 is fairly long and extends farther rearwardly than the drawing seems to indicate.

Empty boxes 141 are transported to the field on the truck 1 (Fig. 1) whence they are unstacked onto the top flight of the belt 137. From here they are hauled down onto the three roller tables and are filled with trimmed pineapples fairly quickly whereupon the rollers facilitate the displacement of the loaded boxes 140 onto the lower flight of the belt 137. The loaded boxes are removed from the packing conveyor 127 as quickly as they appear at the opening 172 by the same workmen who previously emplaced the empty boxes, and said now loaded boxes are restacked in the truck and presently transported from the field to the cannery. Thus there is no need for great numbers of extra boxes.

Inasmuch as the wheels 51 optionally of the caster type, hitherto described as being demountable, may be left emplaced beneath the extremity of each gathering conveyor 9, it follows that their periodic engagement with the ground will produce a backward strain on the respective conveyor. Even disregarding this circumstance, it is desirable and necessary to brace each gathering conveyor. This is accomplished by a stout wire or rod 193 (Fig. 1), one end of which is emplaced in a clip 194 on the side of the gathering conveyor, the other end being anchored somewhere on the base 6, for example, at the end of the channel iron rest 158.

I claim:

1. Harvesting apparatus comprising a mobile base, a gathering conveyor extending out from the base over a field of fruit for the delivery of the fruit to the base as picked, an independently powered truck having a coupling to the base for transporting the latter and its carried parts, said truck being adapted to carry containers both empty and loaded, a packing conveyor movably mounted on the base and adapted to be stationed lengthwise of and beside the base and truck assemblage, said conveyor including a belt, the respective runs of which are adapted to carry empty containers from the truck to the base and loaded containers from the base to the truck, at least one workman's station on the base supplemented with a roller table for facilitating the handling of the containers both while empty and loaded, means for transporting the fruit from the gathering conveyor to the packing conveyor, and means for adjustably swinging the packing conveyor on its movable mount so as to variously station it in reference to the truck.

2. Harvesting apparatus comprising a mobile base adapted to be transported over a field of fruit, a packing conveyor including a belt, the respective runs of which are adapted to carry empty and loaded containers toward and away from a designated workman's station on the base, means extending across the lower run of the belt for stopping the containers before they reach the end of said run, a vertical stem providing the pivotal mounting for one end of said packing conveyor on the base, drive means for said belt including at least one gear utilizing the stem as an axle, means at a distance from said stem for supporting said packing conveyor, and means working in conjunction with said support for moving the packing conveyor, said means including a movable flexible element having at least one upstanding clip adapted to exercise a push against the packing conveyor.

3. Harvesting apparatus comprising a mobile base, a coupling at one end of the base for the attachment of a truck by which the apparatus is adapted to be transported over a field; conveyor means reaching out from the base and adapted to have articles emplaced thereon for delivery to the base, means used in conjunction with packing said articles in boxes, said means consisting of a packing conveyor disposed longitudinally of the base and truck, and pivot means by which one end of said conveyor is attached contiguously to the opposite end of the base for outward swinging from the base to a flaring position in reference to the truck to facilitate backing the latter to its coupling, and means for transporting fruit from the conveyor means to the packing conveyor.

4. In a harvesting apparatus for pineapples, a packing conveyor pivoted at one end for advancing empty containers to a packing station at one end of the conveyor, means for supplying pineapples to the station, said packing conveyor including a belt, the respective runs of which are adapted to carry empty containers towards the packing station loaded containers away from the packing station, means in the path of the moving loaded containers for stopping said containers at the end of travel of said containers on the lower run, the empty containers being carried by the upper run in a direction which is opposite to the direction of travel of the loaded containers on the lower run and means intermediate the ends of the packing conveyor for swinging the conveyor on its pivot.

5. In a harvesting apparatus for pineapples, a packing conveyor pivoted at one end for advancing empty containers to a packing station at one end of the conveyor, means for supplying pineapples to the station, said packing conveyor including a belt, the respective runs of which are adapted to carry empty containers towards the packing station loaded containers away from the packing station, means in the path of the moving loaded containers for stopping said containers at the end of travel of said containers on the lower run, the empty containers being carried by the upper run in a direction which is opposite to the direction of travel of the loaded containers on the lower run, an endless member disposed transversely and below the lower run of the packing conveyor and intermediate the ends of said conveyor, means extending from the endless member and engaging opposite sides of the packing conveyor and means for moving the endless member for causing the packing conveyor to swing in a horizontal plane on its pivot.

KERMIT J. JACKSON.